United States Patent [19]
MacWilliams et al.

[11] Patent Number: 5,488,639
[45] Date of Patent: Jan. 30, 1996

[54] PARALLEL MULTISTAGE SYNCHRONIZATION METHOD AND APPARATUS

[75] Inventors: Peter D. MacWilliams, Aloha, Oreg.; Dror Avni, Haifa, Israel; Avi Liebermensch, Kfar Vradim, Israel; Anan Baransy, Nazareth, Israel; Robert L. Farrell, Hillsborough, N.J.

[73] Assignee: Intel Corporation, Santa Clara, Calif.

[21] Appl. No.: 171,554

[22] Filed: Dec. 21, 1993

[51] Int. Cl.⁶ .................................................. H04L 7/00
[52] U.S. Cl. .................................................. 375/355; 375/362
[58] Field of Search .................................. 375/106, 118, 375/121; 370/91, 100.1, 105.3, 108, 112

[56] References Cited

U.S. PATENT DOCUMENTS

| | | | |
|---|---|---|---|
| 4,191,849 | 3/1980 | Vrba | 375/106 |
| 4,573,173 | 2/1986 | Yoshida | 370/108 |
| 4,616,211 | 10/1986 | Ross et al. | 375/106 |
| 5,022,056 | 6/1991 | Henderson et al. | 370/108 |
| 5,272,729 | 12/1993 | Bechade et al. | 375/118 |

*Primary Examiner*—Stephen Chin
*Assistant Examiner*—Don N. Vo
*Attorney, Agent, or Firm*—Blakely, Sokoloff, Taylor & Zafman

[57] ABSTRACT

A method and apparatus for synchronizing an asynchronous signal to a clock signal. The apparatus includes an enable generator, first, second and third sampling circuits, a selecting circuit, and can include a latching circuit. The enable generator is coupled to the first sampling circuit by a first enable line, to the second sampling circuit by a second enable line, and to the third sampling circuit by a third enable line. The first, second, and third sampling circuits are coupled to receive the asynchronous signal. The selecting circuit is coupled to receive the output signals of the first, second and third sampling circuits. For the first sampling circuit, the following steps are performed: sampling the asynchronous signal, generating an output signal for the sampling circuit, waiting a period of time, and selecting the sampling circuit's output signal. These steps are also performed for the second sampling circuit and the third sampling circuit.

4 Claims, 6 Drawing Sheets

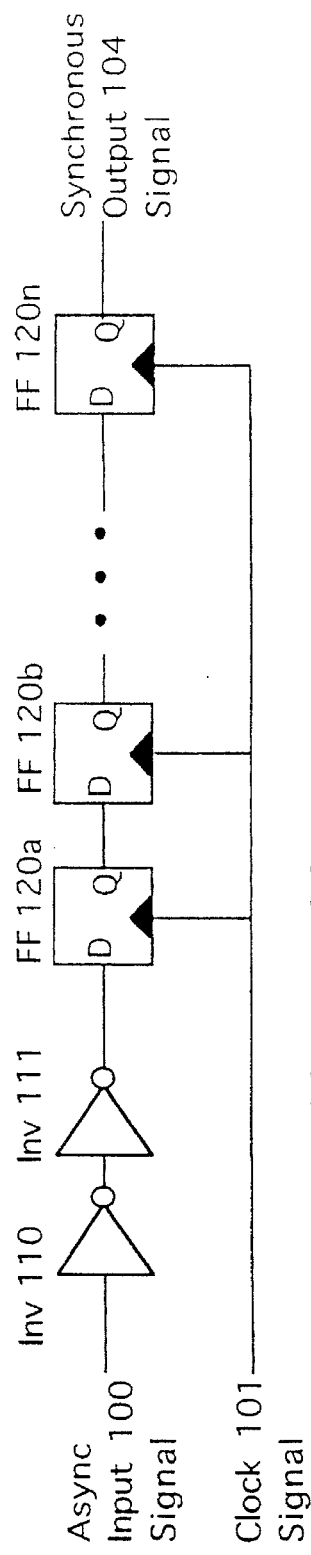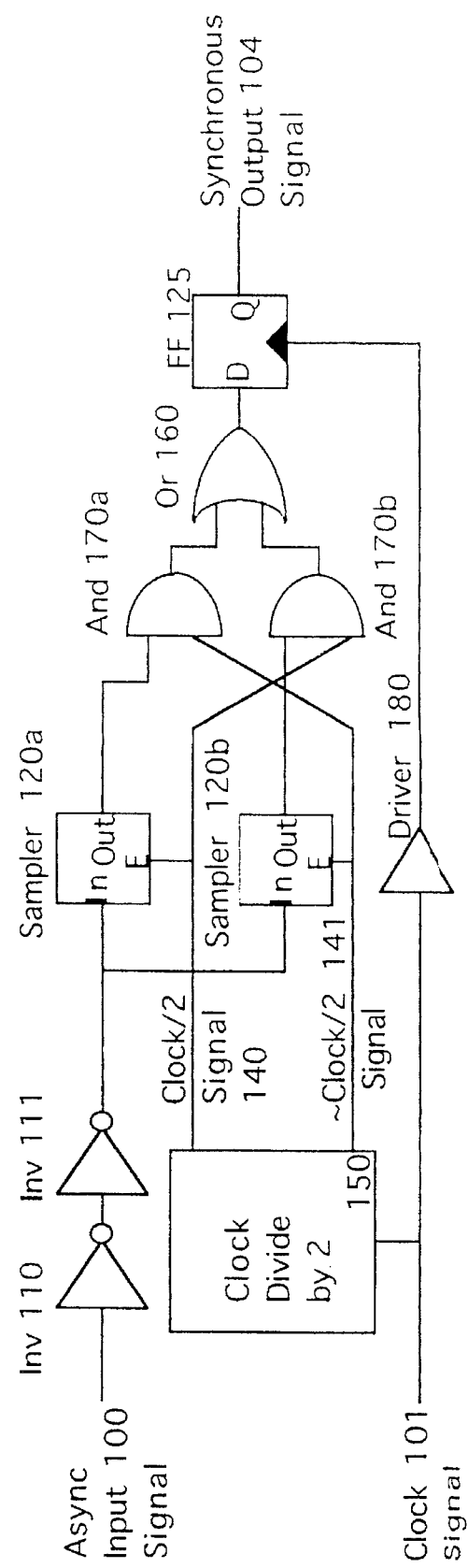
Figure 1A
(Prior Art)
Figure 1B
(Prior Art)

FIG_3

PARALLEL MULTISTAGE SYNCHRONIZATION METHOD AND APPARATUS

BACKGROUND OF THE INVENTION

1. Field of Invention

The present invention relates to the field of synchronizing an asynchronous signal in a computer system.

2. Description of Related Art

GENERAL BACKGROUND

In modern computer systems, many of the components execute asynchronously with respect to each other. Even within one integrated circuit, it is possible to have two subcircuits executing asynchronously with respect to each other. Synchronization problems arise when one component transmits a signal to another component where each component is using different clock signals. For example, part of the process by which a microprocessor accesses memory on a memory card is that the microprocessor must first put the address on the address lines and then transmit a read signal. The memory must wait for the read signal before retrieving the address from the address lines. However, if the memory is not using the same clock as the microprocessor, then the microprocessor's read signal could arrive at arbitrary times relative to the memory's clock. That is, the read signal is said to be asynchronous with respect to the memory clock. The memory must synchronize the read signal before attempting to use the read signal.

One simple method of synchronizing the read signal is to use a flip-flop to sample the read signal. The memory's clock enables the flip-flop to sample the read signal. That is, the read signal appears on the input of the flip-flop and the clock enables the flip-flop to store, and eventually output, the read signal. One problem with this basic solution is that the flip-flop requires time for its output to settle. While the output is settling, the output should not be used or inaccurate results can occur. As the read signal changes value closer in time to the time at which the flip-flop samples the read signal, the time required for the output to settle increases substantially. In theory, the time to settle can be infinite if the sampling point occurs at the time the read signal changes. This is called a metastable state. However, the longer the memory waits to use the output from the flip-flop, the higher the probability that the output has stabilized. Therefore, the higher the probability that the output has stabilized, the higher the reliability of the overall system. (Hereinafter, any circuit used as a basic sampling circuit, as the flip-flop of above is used, is referred to as a sampler.)

Prior art systems have addressed the above problem by waiting a number of clock cycles after a sample before using the synchronized output. For example, FIG. 1A illustrates a circuit where the output of one master/slave flip-flop, FF 120a, cascades into the input of another master/slave flip-flop, FF 120b. This circuit is thought to increase the probability that the output has settled, and therefore, increase the reliability of the overall system. However, reliability decreases as the clock frequency increases. Thus, for modern high-speed circuits, this solution is limited. A variation of this design involves reducing the clock frequency to the flip-flops, thereby reducing the sampling rate so the flip-flops have more time to settle. However, this solution increases the amount of time required to obtain a sample of the asynchronous signal. For example, if sampling occurs every fourth clock period, and if the read signal does not appear on a first sample, then the memory must wait four more clock periods to attempt to synchronize the read signal. FIG. 1B illustrates another solution that uses two samplers in parallel. A first sampler 120a samples an asynchronous input, async input signal 100, on one clock cycle and a second sampler 120b samples the async input signal 100 on the next clock cycle. This maximizes the time available in a clock cycle for the output to settle. However, like the prior art of FIG. 1A, a sampler has only one clock cycle for its output to settle. Like the prior art of FIG. 1A, as the clock frequency increases in modern circuits, this solution will not provide sufficient time for each sampler to settle. For example, where the clock signal 101 is running at 100 MHz, the clock cycle period is only 10 ns. For acceptable reliability of the overall system, each sampler may need more than the 10 ns to settle provided by this design.

As such, what is needed is an apparatus and method for synchronizing an asynchronous signal to a high speed clock signal that allows for improved reliability by providing sufficient time for the outputs of the sampling circuits to settle, while minimizing the overall delay of the synchronization process.

SUMMARY OF THE INVENTION

According to the present invention, a method and apparatus are provided for synchronizing an asynchronous signal to a clock signal. In one embodiment of the present invention, three or more samplers are used in parallel to provide reliable operation of a system operating at high clock rates, and causes minimal impact on the performance of the system.

In computer systems, different circuits will operate asynchronously with respect to each other. For example, an asynchronous input signal will transition (change value) asynchronously with respect to a first circuit of the computer system. Depending on when the asynchronous input signal transitions with respect to when the signal is being sampled, the time required for a sampler's output to settle can vary substantially. If sufficient time is not allowed for, the reliability of the system can be adversely affected. In an embodiment of the present invention, a sample of the asynchronous input signal is provided every clock period of the synchronous circuit, while providing each sampler with more than one clock period to settle. This solution has the advantage of uncoupling the synchronous circuit's clock period from the time required for the sampled signal to settle. Further, this solution has the advantage of causing minimal impact on the system's performance by providing a sample of the asynchronous input signal to the synchronous circuit every clock period. As circuit speeds increase, and clock periods decrease, these advantages maintain the reliability of the system while minimally impacting performance.

In one embodiment of the present invention, the apparatus includes an enable generator, first, second and third sampling circuits, a selecting circuit, and a latching circuit. The enable generator is coupled to the first sampling circuit by a first enable line, to the second sampling circuit by a second enable line, and to the third sampling circuit by a third enable line. The first, second, and third sampling circuits are coupled to receive the asynchronous signal. The selecting circuit is coupled to receive the output signals of the first, second and third sampling circuits. The output of the latching circuit represents the synchronized signal. For the first sampling circuit, the following steps are performed: sampling the asynchronous signal, generating an output signal for the sampling circuit, waiting a period of time, and selecting the sampling circuit's output signal. These steps are also performed for the second sampling circuit and the third sampling circuit.

In another embodiment of the present invention, additional sampling circuits are added to allow each sampler additional time for its output to settle. Adding additional stages decreases the likelihood that an unsettled output of a sampling circuit will be used. To add a fourth sampling circuit, the enable generator must generate a fourth enable signal. The fourth sampling circuit's output is coupled to the selecting circuit. Therefore, the above steps are performed for the fourth sampling circuit.

In another embodiment of the present invention, the clock signal defines a first, second, and third period of time. During the first period of time, the output of the second sampling circuit is selected and latched, while the first sampling circuit samples the asynchronous signal and generates an output signal. During the second period of time, the output of the third sampling circuit is selected and latched, while the second sampling circuit samples the asynchronous signal and generates an output signal. During the third period of time, the output of the first sampling circuit is selected and latched, while the third sampling circuit samples the asynchronous signal and generates an output signal.

The prior art did not provide a system of sampling the asynchronous data every period of time while providing more than one period of time for the output of the sampling device to settle. Note that in the above embodiment, the first sampling circuit has had two time periods for the its output to settle. During a fourth time period, the second sampling circuit's output would be selected and latched. Thus, the second sampling circuit's output would also had two full periods to settle. Note also that from the latching circuit's perspective, a settled sampled output is provided for every period of time.

In another embodiment of the present invention, the selecting circuit includes a first circuit coupled to receive the output of the first sampler and a third enable signal; a second circuit coupled to receive the output of the second sampler and a first enable signal, and a third circuit coupled to receive the output of the third sampler and a second enable signal. Each circuit transmits a selected output signal responsive to that circuit's input signals.

In another embodiment of the present invention, the enable generator includes a ripple counter.

In another embodiment of the present invention, the selecting circuit includes a multiplexor.

In another embodiment of the present invention, each of the sampling circuits includes cross-coupled nand gates.

BRIEF DESCRIPTION OF THE DRAWINGS

The present invention is illustrated by way of example, and not limitation, in the Figures. Like references indicate similar elements.

FIG. 1A illustrates a prior art synchronizer using a cascade of master/slave flip-flops.

FIG. 1B illustrates a prior art synchronizer using two samplers, rather than a master/slave flip-flop.

DESCRIPTION OF THE PREFERRED EMBODIMENT

An apparatus and method of synchronizing an asynchronous signal to a high speed clock signal that allows for improved reliability by providing sufficient time for the outputs of the sampling circuits to settle, while minimizing the overall delay of the synchronization process, is described. In the following description, numerous specific details are set forth such as the sampling circuit components, and the components of the selecting circuit, etc., to provide a thorough understanding of the present invention. It will be clear, however, to one skilled in the an that the present invention may be practiced without these specific details. In other instances, well-known circuits, structures and techniques have not been shown in detail in order not to unnecessarily obscure the present invention.

SYSTEM LEVEL

Figure 2:
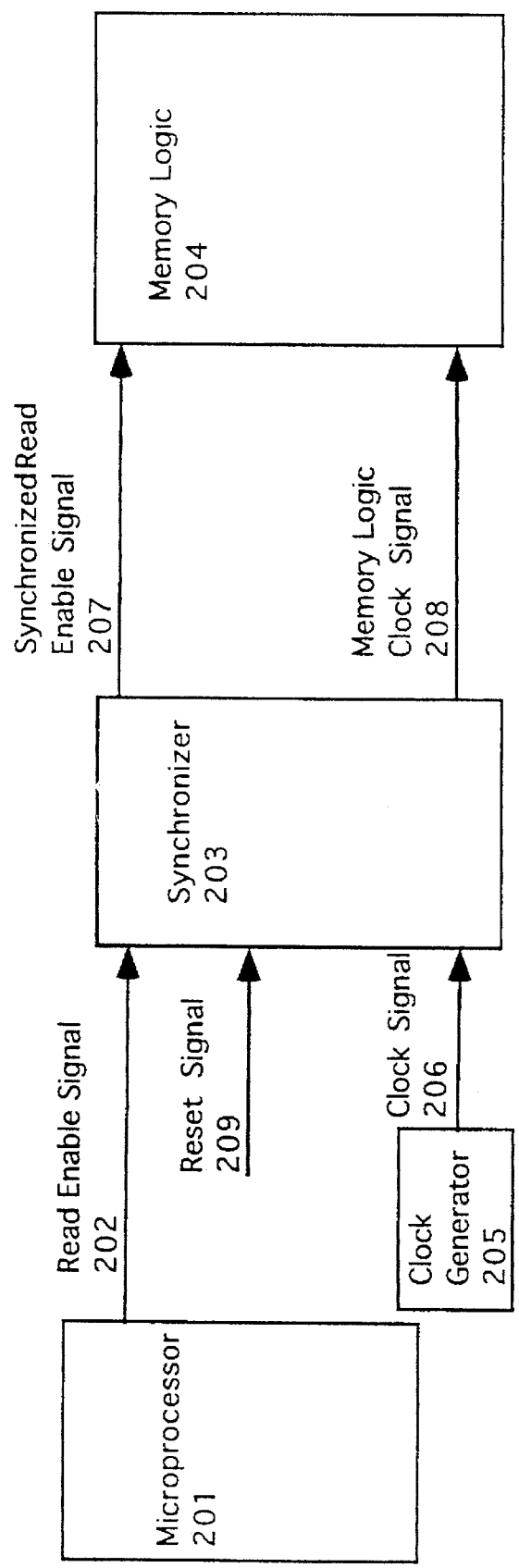
FIG. 2 illustrates one embodiment of a system that uses the methods and apparatus of the present invention.

FIG. 2 illustrates an embodiment of a system that uses a synchronizer constructed in accordance with the principles of the present invention. A synchronizer 203 is coupled to receive a read enable signal 202 from a microprocessor 201. The synchronizer 203 is further coupled to receive a clock signal 206 from a clock generator 205. The synchronizer 203 is further coupled to receive a reset signal 209. The synchronizer 203 generates a synchronized read enable signal 207 and a memory logic clock signal 208. A memory logic 204 is coupled to receive both the synchronized read enable signal 207 and the memory logic clock signal 208 from the synchronizer 203.

FIG. 2 illustrates a system wherein a microprocessor 201 transmits the read enable signal 202 to the memory logic 204. The read enable signal 202 is asynchronous with respect to the clock signal 206. For the memory logic 204 to be able to use the read enable signal 202, the read enable signal 202 must be made synchronous with the memory logic clock signal 208. The synchronizer 203 synchronizes the read enable signal 202 with clock signal 206, thereby generating the synchronized read enable signal 207. The memory logic 204 can then use the synchronized read enable signal 207 in its internal logic.

In this embodiment, the synchronizer 203 can be reset, for example, at system startup. Furthermore, the synchronizer 203 also generates the memory logic clock signal 208 that represents the delayed clock signal 206. Although not a necessary element of the synchronizer 203, this delay of clock signal 206 helps ensure better synchronization with the read enable signal 207.

FIVE STAGE PARALLEL SYNCHRONIZER

FIVE STAGE PARALLEL SYNCHRONIZER STRUCTURE

Figure 3:
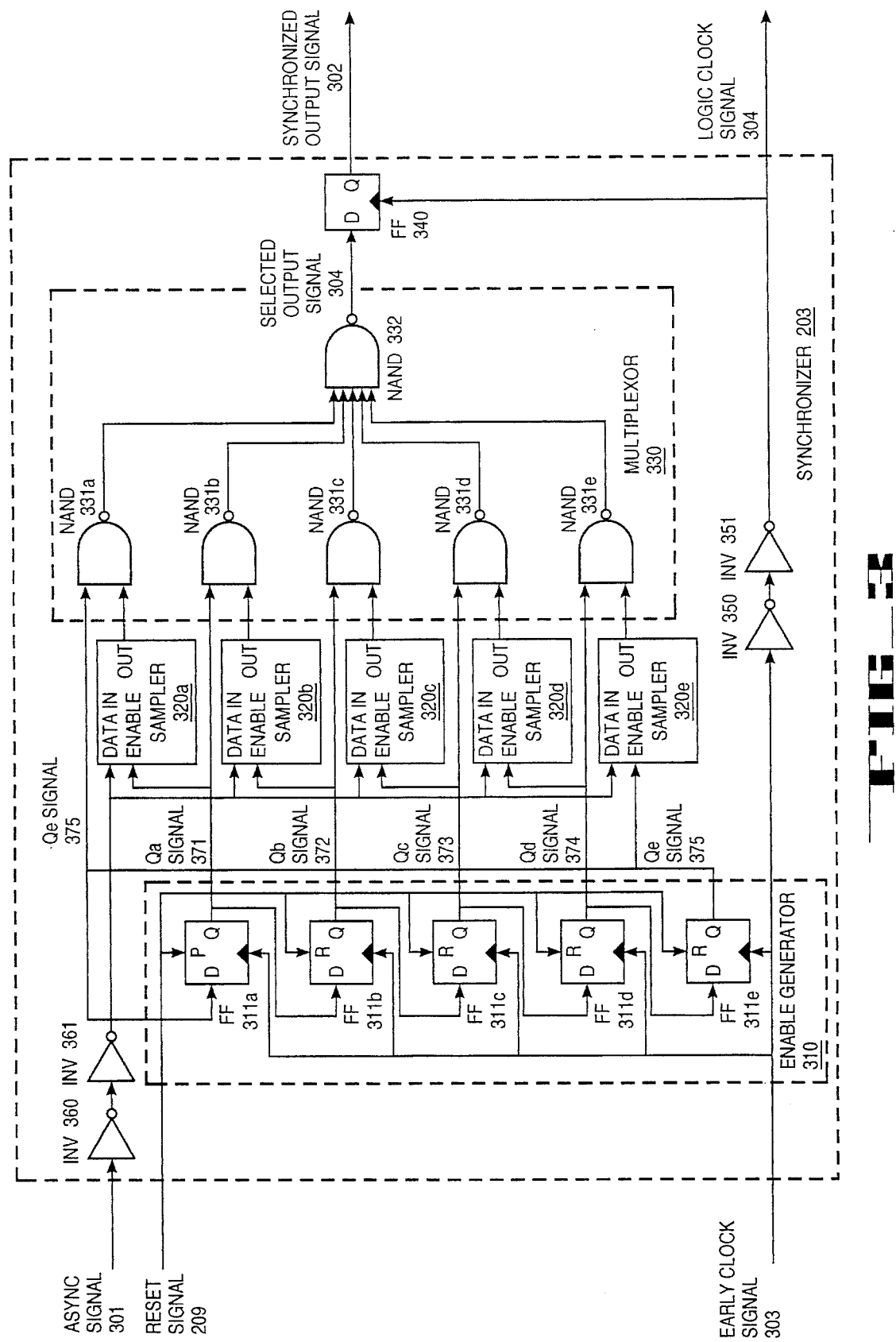
FIG. 3 illustrates one embodiment of the present invention.

FIG. 3 illustrates one embodiment of a synchronizer structure. Although a five stage parallel synchronizer is shown, one skilled in the art would understand that a parallel synchronizer of three or more stages could be used without deviating from the scope of the invention.

The structure of the elements of FIG. 3 is as follows. A synchronizer 203 accepts as inputs an async signal 301, a reset signal 209, and an early clock signal 303, and generates a synchronized output signal 302 and a logic clock signal 305. Using the FIG. 3 synchronizer 203 in the FIG. 2 system, the async signal 301 would be the read enable signal 202, the early clock signal 303 would be the clock signal 206, the synchronized output signal 302 would be synchronized read enable signal 207, and logic clock signal 305 would be memory layer clock signal 208. The async signal 301 is an asynchronous signal that can change values (transition from a high to a low or from a low to a high) asynchronously with respect to the early clock signal 303. The synchronizer 203 has three main components: an enable generator 310, samplers 320a–e, a multiplexor 330, and includes some additional circuitry.

The enable generator 310 includes D flip-flops, FF 311a–e, cascaded to create a shift register. The enable generator generates one high output signal and four low output signals during each clock period. That is, the input D of the FF 311a is coupled to receive the output Qe signal 375 of the FF 311e, the input D of the FF 311b is coupled to receive the output Qa signal 371 of the FF 311a, the input D of the FF 311c is coupled to receive the output Qb signal 372 of the FF 311b, the input D of the FF 311d is coupled to receive the output Qc signal 373 of the FF 311c, and the input D of the FF 311e is coupled to receive the output Qd signal 374 of the FF 311d. The clock input of each D flip-flop, FF 311a–e, is coupled to receive the early clock signal input 303. Further, the set input of the FF 311a and the reset input of each FF 311b–e is coupled to receive the reset signal 209. Thus, the enable generator generates one high output signal and four low output signals for each clock period. Although the components of the enable generator 310 are described herein, one skilled in the art would understand that any suitable circuit for generating enable signals to the sampling elements could be employed.

Regarding the samplers 320a–e, the async signal 301 is received at the input to inv 360, an inverter. The output of the inv 360 is coupled to the input of inv 361, an inverter. The output of the inv 361 is coupled to the data input of each sampler 320a–e. This provides a clean input signal, with fast rise and fall times, to the samplers 320a–e. The output Qa signal 371 is coupled to the enable input of the sampler 320a. The output Qb signal 372 is coupled to the enable input of the sampler 320b. The output Qc signal 373 is coupled to the enable input of the sampler 320c. The output Qd signal 374 is coupled to the enable input of the sampler 320d. The output Qe signal 375 is coupled to the enable input of the sampler 320e.

The multiplexor 330 includes six nand gates. The inputs of a nand 331a connect to the output of the sampler 320a and to the Qe signal 375. The inputs of a nand 331b connect to the output of the sampler 320b and to the Qa signal 371. The inputs of a nand 331c connect to the output of the sampler 320c and to the Qb signal 372. The inputs of a nand 331d connect to the output of the sampler 320d and to the Qc signal 373. The inputs of a nand 331e connect to the output of the sampler 320e and to the Qd signal 374. The outputs of a nands 331a–e connect to the inputs of a nand 332. The output of the nand 332 represents a selected output 304. The selected output 304 is a synchronized representation of the async signal 301. Although the specific details of the multiplexor are shown, one skilled in the art would understand that other circuits for selecting one output of a number of outputs could be employed.

The synchronizer 203 also includes additional circuitry, such as, the D flip-flop FF 340, and the inverters inv 350, inv 351, inv 360, and inv 361. The selected output signal 304 is coupled to the input of the FF 340. The logic clock signal 305 is coupled to the clock input signal of the FF 340. This flip-flop is used to latch the selected output signal 304. The Q output of the FF 340 represents the synchronized output signal 302. The input of the inv 350 is coupled to receive the early clock signal 303. The output of the inv 350 is coupled to the input of the inv 351. The inv 350 and the inv 351 match the delay of the path through a nand 331 and the nand 332. This provides each sampler the maximum amount of time to settle before a sample is taken. Note that in one embodiment, logic clock signal 305 can be but one of many logic clocks in a clock distribution tree. Such trees are typically found in a VLSI device or system.

FIVE STAGE PARALLEL SYNCHRONIZER OPERATION

Above is discussed the general structure of the five stage parallel synchronizer. The following is a discussion of the operation of the five stage parallel synchronizer. After a reset signal 209, an enable generator 310 begins shifting a one, or high level, from the output of the FF 311a to the input of the FF 311b, etc., until the one returns to the input of the FF 311a, where the shifting process repeats. Thus, on every cycle of the early clock signal 303, one sampler of the samplers 320a–e is enabled to sample the async signal 301.

The multiplexor 330 selects the output of the sampler that has had the most amount of time to settle. Therefore, when the sampler 320a is being enabled by the Qa signal 371, the Qa signal 371 is also causing the selection of the output of the sampler 320b to appear as the selected output signal 304. In this embodiment, at the time the Qa signal 371 is one, the sampler 320b will have had four clock cycles to have settled.

The inv 360 and the inv 361 act as buffers for the async signal 301. Similarly the inv 350 and the inv 351 act as buffers for the early clock signal 303 and provide more time for the samplers 320a–e to settle.

CIRCUIT FOR SAMPLING DATA (A SAMPLER)

Figure 4:
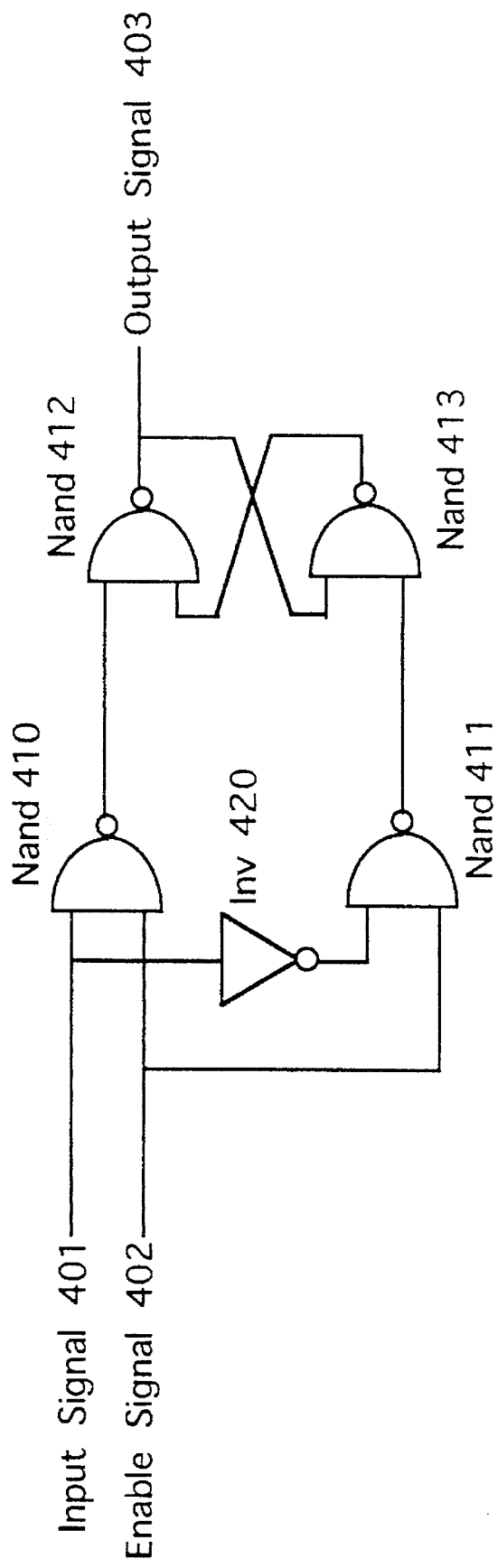
FIG. 4 illustrates one embodiment of a circuit for sampling data (a sampler) in one embodiment of the present invention.

FIG. 4 illustrates one embodiment of a circuit for sampling data (a sampler) in one embodiment of the present invention. Other sampling circuits are known and can be used to implement this invention.

The structure of the sampler circuit is as follows. The circuit accepts as input an input signal 401, an enable signal 402, and generates an output signal 403. The input of a nand 410 is coupled to receive the input signal 401 and the enable signal 402. The input of an inv 420 is coupled to receive the input signal 401. The input of a nand 411 is coupled to the output of the inv 420 and the enable signal 402. The input of a nand 412 is coupled to the output of the nand 410 and the output of a nand 413. The input of the nand 413 is coupled to the output of the nand 411 and the output of the nand 412. The output of the nand 412 represents the output signal 403.

The operation of the sampler of FIG. 4 is as follows. When the enable signal 402 is high, the input signal 401 is allowed to pass through the sampler. When the enable signal 402 transitions low, the sampler holds the previous state of the input signal 401. When the input signal 401 changes at approximately the same time as the enable signal 402, the time required for the output signal 403 to settle can lengthen considerably.

TIMING DIAGRAM FOR THE FIVE STAGE PARALLEL SYNCHRONIZER

Figure 5:
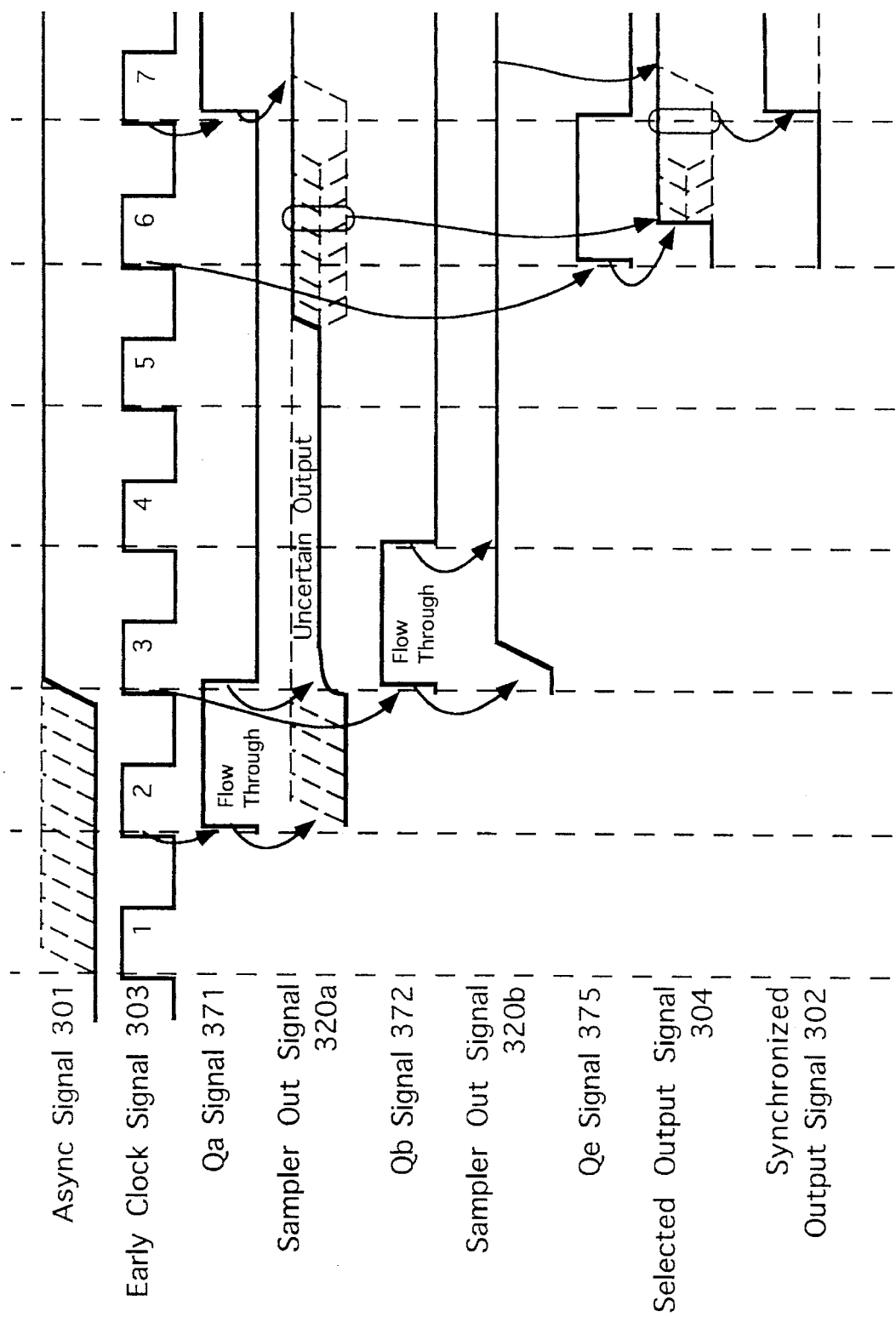
FIG. 5 illustrates a timing diagram of the operation of one embodiment of the present invention.

FIG. 5 illustrates a timing diagram of the operation of one embodiment of the present invention. FIG. 5 illustrates the timing of signals during the normal operation of the synchronizer 203. Time intervals are referred to as a number of the early clock signal 303 cycles. Therefore, a cycle 1 would be the time immediately after the rising edge of the first complete early clock cycle.

Assume that immediately after the cycle 1, the input to the FF 311a is high. Therefore, at cycle 2, early clock signal 303 causes the FF 311a to latch a high signal and to output a high Qa signal 371 soon thereafter. This is shown as the first high value of the Qa signal 371. The high Qa signal 371 enables the sampler 320a to latch the value of the async signal 301. In one embodiment of the present invention, the sampler 320a is a level sensitive latch. Therefore, at cycle 3, the sampler 320a is 'closed', trapping the value of async signal 301. However, as is shown at cycle 3, the async signal 301 may transition at approximately the same time sampler 320a samples. This may cause the sampler 320a to become metastable, thereby increasing the delay for a stable output. For the purposes of illustration, this settling is shown in FIG. 5 as uncertain output and continues past cycle 5. In other instances, the sampler out signal 320a could have transitioned earlier or later, and could have dropped to a low value, rather than a high value. Also, as shown in dashed lines, if the async signal 301 transitions such that the set up and hold times for the sampler 320a are not violated, then sampler 320a will properly latch the value of the async signal 301.

As noted in the description of the enable generator 310, the high value of the output of the FF 320a will be shifted, on the next clock cycle, to the FF 320b. In FIG. 5, this is illustrated by the Qb signal 372 transitioning high soon after cycle 3. The high Qb 372 enables the sampler 320b to sample the async signal 301. Note that because the async signal 301 is not changing near the time that the Qb signal 372 is enabling the sampler 320b to sample the async signal 301, the time for sampler out signal 320b to settle is considerably shorter than is the time for the sampler out signal 320a to settle. Thus, in this example, the sampler out signal 320b settles before the sampler out signal 320a.

From cycle 4 through to cycle 6, each of the remaining D flip-flops FF 311c-e latch the high value in turn. Thus, at cycle 6, the Qe signal 375 transitions high. This enables the nand 331 to output the value of the sampler 320a. Thus, the selected output signal 304 generates a high value. If the sampler out signal 320a had not settled by this time, selected output signal 304 would not be settled. However, system designers can use embodiments of the present invention that allow sufficient time for the sampler out signal 320a to settle, such that the probability that the sampler out 320a has not settled is not the most significant factor in the system's mean time between failure. The D flip-flop FF 340 latches this selected output signal value 304, causing the synchronized output signal 302 to transition high in the next clock cycle. If selected output signal 304 had settled low by cycle 7, then D flip-flop FF 340 would have latched a low selected output signal value 304. This would cause synchronized output signal 302 to be low. Note also that at cycle 7, the selected output signal 304 would be representative of the sampler out signal 320b.

FLOWCHART FOR THE FIVE STAGE PARALLEL SYNCHRONIZER

Figure 6:
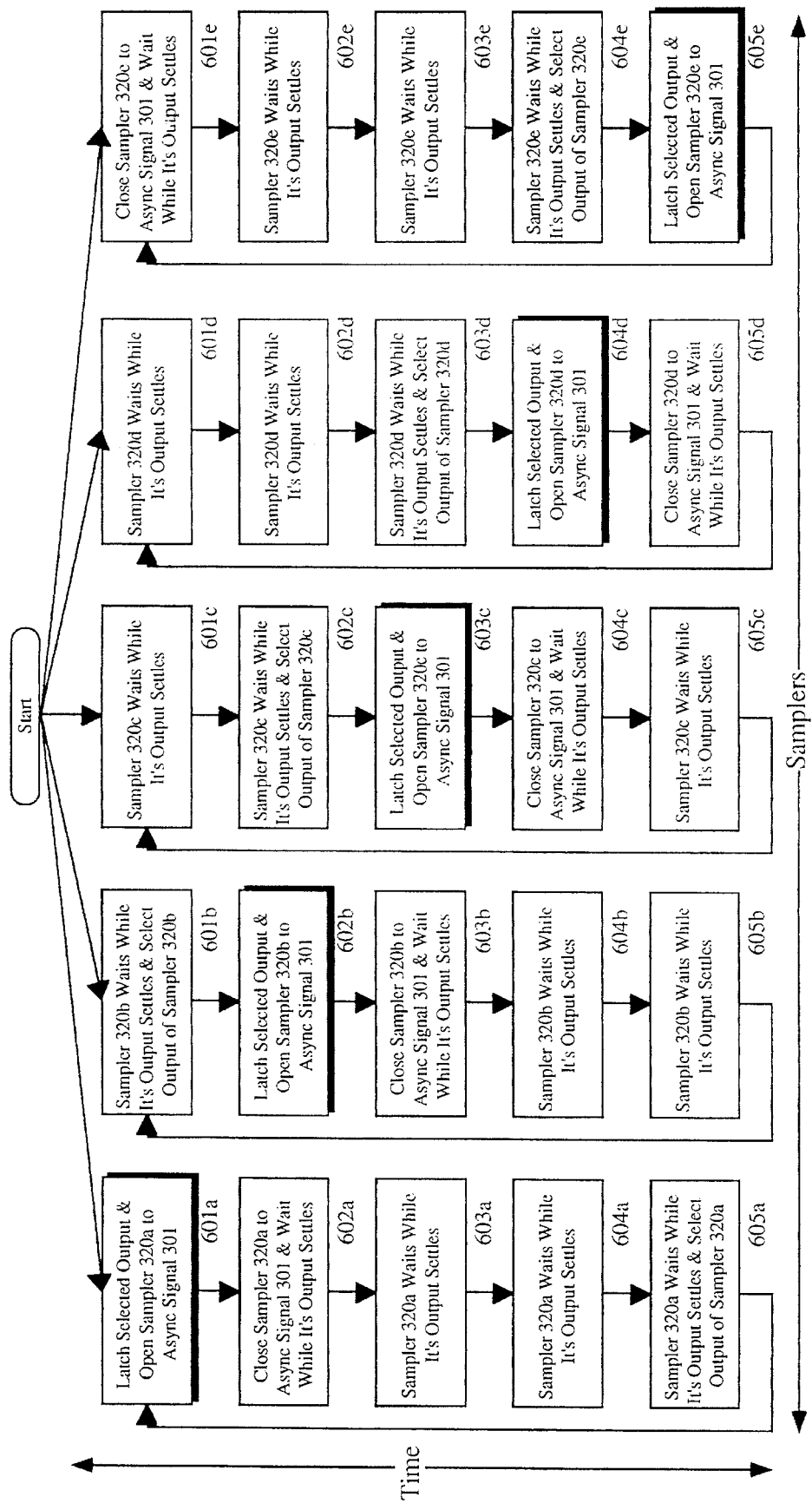
FIG. 6 illustrates a flow chart of the operation of one embodiment of the present invention.

FIG. 6 illustrates a flow chart of the operation of one embodiment of the present invention. Each block of FIG. 6 shows one step performed by one sampler 320a–e of the five stage parallel synchronizer. A column represents the steps performed by one sampler. Each row represents the steps being performed simultaneously by the five samplers during one clock cycle. FIG. 6 illustrates the operation of the five stage parallel synchronizer after a reset, and during the normal course of operations.

During normal operations, at a steps 601a–e, the selected output signal 304 is latched, and the sampler 320a is opened to allow the async signal 301 to flow through. The sampler 320b is closed to the async signal 301 and the sampler 320b begins waiting for its output to settle. The sampler 320c is waiting for its output to settle. The sampler 320d is waiting for its output to settle. The sampler 320e waits while its output settles and its output is selected.

At steps 602a–e, the sampler 320a is closed to the async signal 301 and the sampler 320a begins waiting for its output to settle. The sampler 320b is waiting for its output to settle. The sampler 320c is waiting for its output to settle. The sampler 320d waits while its output settles and its output is selected. The selected output signal 304 is latched, and the sampler 320e is opened to allowed the async signal 301 to flow through.

At steps 603a–e, the sampler 320a is waiting for its output to settle. The sampler 320b is waiting for its output to settle. The sampler 320c waits while its output settles and its output is selected. The selected output signal 304 is latched, and the sampler 320d is opened to allowed the async signal 301 to flow through. The sampler 320e is closed to the async signal 301 and the sampler 320e begins waiting for its output to settle.

At steps 604a–e, the sampler 320a is waiting for its output to settle. The sampler 320b waits while its output settles and its output is selected. The selected output signal 304 is latched, and the sampler 320c is opened to allowed the async signal 301 to flow through. The sampler 320d is closed to the async signal 301 and the sampler 320d begins waiting for its output to settle. The sampler 320e is waiting for its output to settle.

At steps 605a–e, the sampler 320a waits while its output settles and its output is selected. The selected output signal 304 is latched, and the sampler 320b is opened to allowed the async signal 301 to flow through. The sampler 320c is closed to the async signal 301 and the sampler 320c begins waiting for its output to settle. The sampler 320d is waiting for its output to settle. The sampler 320e is waiting for its output to settle.

Steps 601a–e through 605a–e are then repeated. Thus, step 601a is executed for the sampler 320a. The sampler 320a's output will be latched as the synchronized output of the five stage parallel synchronizer only after steps 602a through 605a are performed. This gives the sampler 320a's output four steps to settle. Also notice that this synchronizer has a minimum impact on the entire system because a sample of the async signal 301 is proved at every step of the synchronizer's process (601a, 602b, 603c, 604d, and 605e respectively).

Thus, an apparatus and method of synchronizing an asynchronous signal to a high speed clock signal that allows for improved reliability by providing sufficient time for the outputs of the sampling circuits to settle, while minimizing the overall delay of the synchronization process, has been described.

What is claimed is:

1. A synchronizing method for synchronizing an asynchronous signal with a clock signal in a synchronizer, said asynchronous signal being asynchronous to said clock signal in both phase and frequency, said synchronizer including an enable generator, a first sampling circuit, a second sampling circuit, a third sampling circuit, a selecting circuit, and a latching circuit, said enable generator coupling to said first sampling circuit via a first enable line, said enable generator coupling to said second sampling circuit via a second enable line, and said enable generator coupling to said third sampling circuit via a third enable line, said first, said second and third sampling circuits coupling to receive said asynchronous signal, said selecting circuit coupling to receive output of said first, second and third sampling circuits, said latching circuit coupling to receive the output of said selecting circuit, said synchronizing method comprising the steps of:

said first sampling circuit sampling said asynchronous signal;

generating an output signal for said first sampling circuit;

waiting a first period of time;

at a first time, selecting the output of said first sampling circuit to correspond to a synchronized output;

said second sampling circuit sampling said asynchronous signal;

generating an output signal for said second sampling circuit;

waiting a second period of time;

at a second time, selecting the output of said second sampling circuit to correspond to said synchronized output;

said third sampling circuit sampling said asynchronous signal;

generating an output signal for said third sampling circuit;

waiting a third period of time;

at a third time, selecting the output of said third sampling circuit to correspond to said synchronized output;

said first sampling circuit sampling said asynchronous signal a second time;

generating an output signal for said first sampling circuit a second time;

waiting a fourth period of time; and at a fourth time, selecting the output of said first sampling circuit a second time to correspond to said synchronized output.

2. The synchronizing method of claim 1 wherein said synchronizer further includes a fourth sampling circuit, said enable generator coupling to said fourth sampling circuit via a fourth enable line, said fourth sampling circuit coupling to receive said asynchronous signal, and said selecting circuit couples to receive output of said fourth sampling circuit, said synchronizing method further comprising the steps of:

after said selecting the output of said third sampling circuit and before said selecting the output of said first sampling circuit a second time, performing the following steps said fourth sampling circuit sampling said asynchronous signal a first time, generating an output signal for said fourth sampling circuit, waiting a period of time, and at a time after said third time and before said fourth time, selecting the output of said fourth sampling circuit to correspond to said synchronized output.

3. The synchronizing method of claim 2 wherein said synchronizer further includes a fifth sampling circuit, said enable generator couples to said fifth sampling circuit via a fifth enable line, said fifth sampling circuit couples to receive said asynchronous signal, and said selecting circuit couples to receive output of said fifth sampling circuit, said synchronizing method further comprising the steps of:

after said selecting the output of said fourth sampling circuit and before said selecting the output of said first sampling circuit a second time, performing the following steps said fifth sampling circuit sampling said asynchronous signal a first time, generating an output signal for said fifth sampling circuit, waiting a period of time, and at a time after said third time and before said fourth time, selecting the output of said fifth sampling circuit to correspond to said synchronized output.

4. A synchronizing method for synchronizing an asynchronous signal with a clock signal in a synchronizer, said synchronizer including an enable generator, a first sampling circuit, a second sampling circuit, a third sampling circuit, a selecting circuit, and a latching circuit, said enable generator coupling to said first sampling circuit via a first enable line, said enable generator coupling to said second sampling circuit via a second enable line, and said enable generator coupling to said third sampling circuit via a third enable line, said first, said second and third sampling circuits coupling to receive said asynchronous signal, said selecting circuit coupling to receive output of said first, second and third sampling circuits, said clock signal defining a first period of time, a second period of time, and a third period of time, said synchronizing method comprising the steps of:

a) during said first period of time
  a.i) latching the output of said first sampling circuit.
  a.ii) enabling said first sampling circuit to sample said asynchronous signal,
  a.iii) generating the output of said first sampling circuit,
  a.iv) selecting the output of said second sampling circuit to correspond to a synchronized signal, and b) during said second period of time
  b.i) latching the output of said second sampling circuit;
  b.ii) enabling said second sampling circuit to sample said asynchronous signal,
  b.iii) generating the output of said second sampling circuit,
  b.iv) selecting the output of said third sampling circuit to correspond to a synchronized signal, c ) during said third period of time
  c.i) latching the output of said third sampling circuit, and
  c.ii) enabling said third sampling circuit to sample said asynchronous signal,
  c.iii) generating the output of said third sampling circuit,
  c.iv) selecting the output of said first sampling circuit to correspond to a synchronized signal.

* * * * *

UNITED STATES PATENT AND TRADEMARK OFFICE
CERTIFICATE OF CORRECTION

PATENT NO. : 5,488,639
DATED : January 30, 1996
INVENTOR(S) : MacWilliams et al.

It is certified that error appears in the above-identified patent and that said Letters Patent is hereby corrected as shown below:

In column 1 at line 14 delete "modem" and insert --modern--

In column 1 a line 60 delete "modem" and insert --modern--

In column 4 at line 21 delete "an" and insert --art--

In column 5 at line 36 delete "an" and insert --art--

Signed and Sealed this

Eighteenth Day of February, 1997

Attest:

BRUCE LEHMAN

Attesting Officer      Commissioner of Patents and Trademarks